United States Patent Office

3,032,551
Patented May 1, 1962

3,032,551
PYRROLO(3',2'-2,3)-ANDROSTANES AND PROCESS THEREFOR
James C. Orr and Albert Bowers, Mexico City, Mexico, assignors to Syntex S.A., Mexico City, Mexico, a corporation of Mexico
No Drawing. Filed May 25, 1961, Ser. No. 112,542
19 Claims. (Cl. 260—239.5)

The present invention relates to novel cyclopentanophenanthrene compounds and to a process for the production thereof.

More particularly the present invention relates to novel pyrrolo(3',2'-2,3)-androstane derivatives.

The novel compounds of the present invention are anabolic and androgenic agents having a favorable anabolic-androgenic ratio, exhibit anti-estrogenic activity, anti-gonadotrophic activity, are central nervous system depressants, have anti-fibrillatory effect, suppress the secretion of the pituitary gland and lower the blood cholesterol level, and may be represented by the following formulas:

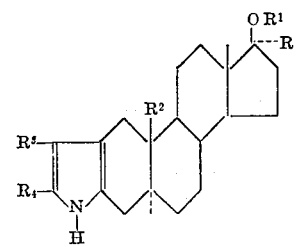

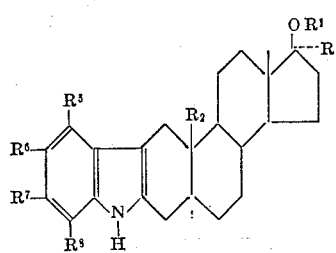

In the above formula, R represents hydrogen or an alkyl, alkenyl or alkynyl group of less than 8 carbon atoms; $R^1$ represents hydrogen or a hydrocarbon carboxylic acyl group containing less than 12 carbon atoms; $R^2$ is hydrogen or methyl; $R^3$ and $R^4$ represent hydrogen or a lower alkyl group; $R^5$, $R^6$, $R^7$, and $R^8$ represent hydrogen, a lower alkyl group, nitro or a halogen such as bromo, chloro, iodo or fluoro, and $R^6$ and $R^7$ together may represent a benzene ring.

The acyl group is derived from hydrocarbon carboxylic acids of less than 12 carbon atoms, saturated or unsaturated, of straight, branched, cyclic or cyclic-aliphatic chain and may be substituted by functional groups such as hydroxy, lower alkoxy, acyloxy containing up to 8 carbon atoms, amino, nitro or halogen. Typical ester groups are the acetate, propionate, butyrate, benzoate, cyclopentyl-propionate, aminoacetate, β-chloropropionate, hemisuccinate, enanthate, caproate, trimethylacetate, methoxyacetate, phenoxyacetate, and phenylpropionate.

The novel compounds of the present invention wherein $R^3$ and $R^4$ represent hydrogen or a lower alkyl group may be prepared by a process illustrated by the following equation:

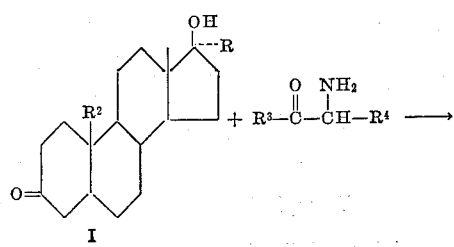

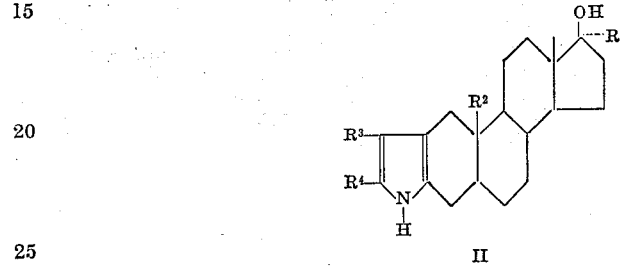

In the above formulae, R, $R^2$, $R^3$ and $R^4$ have the above defined meanings.

In practicing the process outlined above, the starting compound, an androstan-17β-ol-3-one derivative or the 19-nor derivative (I) is condensed with an aliphatic α-amino-ketone as for example, 2-amino-pentan-3-one or an aliphatic α-amino-aldehyde such as amino-acetaldehyde, in the presence of an alkali metal alkoxide, preferably sodium ethoxide to give the corresponding pyrrolo-(3',2'-2,3)-androstan-17β-ol derivative.

The compounds of the present invention containing an indolo moiety may be prepared by a process illustrated by the following equation:

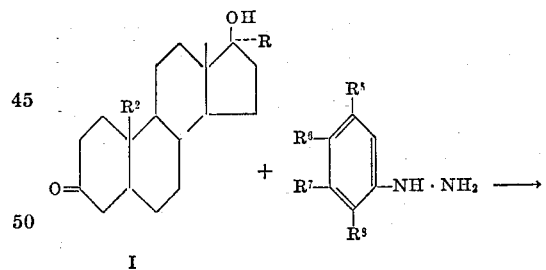

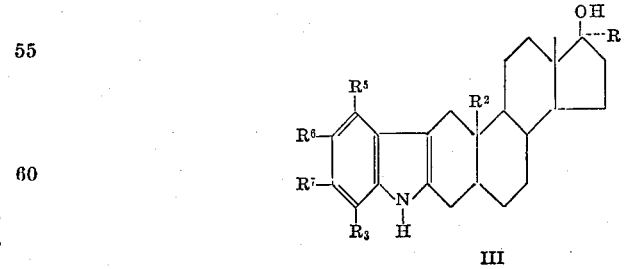

In the above formulae, R, $R^2$, $R^5$, $R^6$, $R^7$ and $R^8$ have the same meaning as previously set forth.

In practicing the process outlined above, the starting compound, an androstan-17β-ol-3-one derivative or the 19-nor derivative (I) thereof is condensed with a phenylhydrazine as for example p-tolylhydrazine or 2,4-dinitrophenylhydrazine in the presence of an acid such as acetic acid, at the temperature of approximately 100° C. and for a period of time of the order of 3 hours, thus affording the corresponding indolo(3',2'-2,3)-androstan-17β-ol derivative.

Any of the above 17β-alcohols having in 17α- a hydrogen may be conventionally acylated in pyridine with an acylating agent to give the corresponding 1'-N-acyl-17-acylate derivative, which upon selective saponification in mild conditions affords the 17-monoacylate.

The 17β-alcohols with substitution at 17α are conventionally acylated with an excess of acylating agent in the presence of p-toluenesulfonic acid to give the corresponding 1'-N-acyl-17-acylate which upon selective saponification affords the 17-monoacylate.

The following specific examples serve to illustrate but are not intended to limit the scope of the present invention:

Example I

To a solution of 2 g. of dihydrotestosterone and 2 g. of sodium in 100 cc. of anhydrous ethanol was added dropwise with stirring a solution of 1 g. of 2-amino-pentan-3-one in 20 cc. of ethanol. The reaction mixture was then left at room temperature for 5 hours, poured into water and extracted with methylene chloride. The extract was washed with water, dried over sodium sulfate and evaporated to dryness. Alumina chromatography and recrystallization from acetone-hexane afforded 4'-ethyl-5'-methyl-pyrrolo(3',2'-2,3)androstan-17β-ol.

Example II

Following exactly the technique described in Example I were treated 17α-methyl-dihydrotestosterone, 17α-vinyl-dihydrotestosterone and 17α-ethynyl-dihydrotestosterone thus furnishing respectively 4'-ethyl-5'-methyl-pyrrolo-(3',2'-2,3) - 17α - methyl - androstan - 17β-ol, 4'-ethyl-5'-methyl - pyrrolo(3',2' - 2,3) - 17α - vinyl - androstan - 17β-ol and 4' - ethyl - 5' - methyl-pyrrolo(3',2'-2,3)-17α-ethynyl-androstan-17β-ol.

Example III

When applying the method described in Example I to 19-nor-dihydrotestosterone, 17α-methyl-19-nor-dihydrotestosterone, 17α - vinyl - 19-nor-dihydrotestosterone and 17α-ethynyl-19-nor-dihydrotestosterone, there were respectively obtained 4'-ethyl-5'-methyl-pyrrolo(3',2'-2,3)-19-nor-androstan-17β-ol, 4'-ethyl-5'-methyl-pyrrolo(3',2'-2,3)-17α-methyl-19-nor-androstan-17β-ol, 4'-ethyl-5'-methyl - pyrrolo(3',2'-2,3) - 17α - vinyl - 19 - nor - androstan - 17β-ol, 4'-ethyl-5'-methyl-pyrrolo(3',2'-2,3)-17α-ethynyl-19-nor-androstan-17β-ol.

Example IV

A solution of 2 g. of dihydrotestosterone and 2 g. of sodium in 100 cc. of anhydrous ethanol was treated dropwise and with constant stirring with a solution of 0.7 g. of amino acetaldehyde in 20 cc. of ethanol. The reaction mixture was kept at room temperature for 5 hours, then poured into water and extracted with methylene chloride. The extract was washed with water, dried over sodium sulfate and evaporated to dryness. Alumina chromatography and recrystallization from acetone-hexane afforded pyrrolo(3',2'-2,3)-androstan-17β-ol.

Treating exactly by the same procedure the starting compounds hereafter set forth, there were obtained the corresponding products indicated:

| Starting compound | Product |
|---|---|
| 17α-methyl-androstan-17β-ol-3-one | pyrrolo(3',2'-2,3) - 17α - methyl-androstan-17β-ol. |
| 17α-vinyl-androstan-17β-ol-3-one | pyrrolo(3',2' - 2,3) - 17α - vinyl - androstan-17β-ol. |
| 17α-ethynyl-androstan-17β-ol-3-one | pyrrolo(3',2' - 2,3) - 17α - ethynyl androstan-17β-ol. |
| 19-nor-dihydrotestosterone | pyrrolo(3',2'-2,3) -19-nor - androstan-17β-ol. |
| 17α-methyl-19-nor- dihydro-testosterone | pyrrolo(3',2'-2,3) - 17α - methyl - 19-nor-androstan-17β-ol. |
| 17α-vinyl-19-nor-dihydro-testosterone | pyrrolo(3',2'-2,3) - 17α-vinyl-19-nor-androstan-17β-ol. |
| 17α-ethynyl-19-nor-dihydrotestosterone | pyrrolo(3'2'-2,3) - 17α - ethynyl-19-nor-androstan-17β-ol. |

Example V

A mixture of 1 g. of dihydrotestosterone, 1 g. of phenylhydrazine and 4 cc. of acetic acid was heated on a steam bath for 3 hours, under an atmosphere of nitrogen. On cooling, there crystallized a crude product which upon recrystallization from ethyl acetate gave indolo(3',2'-2,3)-androstan-17β-ol with a melting point of 257–58° C.

When applying the above method to the starting compounds set forth below and using the hydrazine indicated there were obtained the corresponding products disclosed hereafter:

| Starting compound | Hydrazine | Product |
|---|---|---|
| 19-nor-dihydrotestosterone. | phenylhydrazine | indolo(3',2'-2,3)-19-nor-androstan-17β-ol. |
| 17α-methyl-dihydrotestosterone. | 2,4-dinitrophenylhydrazine. | 5',7'-dinitro-indolo (3',2'-2,3)-17α-methyl-androstan-17β-ol. |
| 17α-vinyl-dihydrotestosterone. | do | 5',7'-dinitro-indolo (3',2'-2,3)-17α-vinyl-androstan-17β-ol. |
| 17α-ethynyl-dihydrotestosterone. | p-bromophenylhydrazine. | 5'-bromo-indolo(3',2'-2,3)-17α-ethynyl-androstan-17β-ol. |
| 17α-methyl-19-nor-dihydrotestosterone. | do | 5'-bromo-indolo(3',2'-2,3)-17α-methyl-19-nor-androstan-17β-ol. |
| 17α-vinyl-19-nor-dihydrotestosterone. | p-tolylhydrazine | 5'-methyl-indolo(3',2'-2,3)-17α-vinyl-19-nor-androstan-17β-ol. |
| 17α-ethynyl-19-nor-dihydrotestosterone. | do | 5'-methyl-indolo(3',2'-2,3)-17α-ethynyl-19-nor-androstan-17β-ol. |
| dihydrotestosterone | 2,3-dimethylphenylhydrazine. | 6',7'-dimethyl-indolo (3',2'-2,3)-androstan-17β-ol. |
| 19-nor-dihydrotestosterone. | do | 6',7'-dimethyl-indolo (3',2'-2,3)-19-nor-androstan-17β-ol. |
| 17α-methyl-dihydrotestosterone. | (2-naphthyl)hydrazine. | benzoindolo (3',2'-2,3)-17α-methyl-androstan-17β-ol. |
| 17α-ethynyl-dihydrotestosterone. | do | benzoindolo (3',2'-2,3)-17α-ethynyl-androstan-17β-ol. |

Example VI 1 g. of 4'-ethyl-5'-methyl-pyrrolo(3',2'-2,3)-androstan-17β-ol in 25 cc. of pyridine was treated with 2 cc. of acetic anhydride. The reaction mixture was left overnight at room temperature, then poured into water and the formed precipitate filtered off, washed with water and dried affording 1'N-acetyl-4'-ethyl-5'-methyl-pyrrolo(3',2'-2,3) - androstan - 17β - ol-17-acetate. This compound was treated for 12 hours with 25 cc. of a 2% potassium hydroxide methanolic solution at 0° C. The mixture was poured into water, the formed precipitate filtered off, washed with water, dried and recrystallized from ethyl acetate-hexane, furnishing the 17-acetate of 4' - ethyl - 5' - methyl - pyrrolo(3',2' - 2,3) - androstan - 17β-ol.

By the above procedure were treated the starting compounds listed below with the indicated anhydride thus affording the products disclosed hereafter:

| Starting compound | Anhydride | Product |
|---|---|---|
| 4'-ethyl-5'-methyl-pyrrolo-(3',2'-2,3)-19-nor-androstan-17β-ol. | acetic | 17-acetate of 4'-ethyl-5'-methyl-pyrrolo (3',2'-2,3)-19-nor-androstan-17β-ol. |
| pyrrolo (3', 2'-2,3)-androstan-17β-ol. | propionic | 17-propionate of pyrrolo (3',2'-2,3)-androstan-17β-ol. |
| pyrrolo(3',2'-2,3)-19-norandrostan-17β-ol. | ----do---- | 17-propionate of pyrrolo (3',2'-2,3)-19-nor-androstan-17β-ol. |
| indolo(3'-2'-2,3)-androstan-17β-ol. | caproic | 17-caproate of indolo (3',2'-2,3)-androstan-17β-ol. |
| indolo(3'-2'-2,3)-19-norandrostan-17β-ol. | ----do---- | 17-caproate of indolo (3',2'-2,3)-19-nor-androstan-17β-ol. |
| 6',7'-dimethyl-indolo(3',2'-2,3)-androstan-17β-ol. | cyclopentyl-propionic. | 17-cyclopentylpropionate of 6',7'-dimethyl-indolo (3',2'-2,3)-androstan-17β-ol. |
| 6',7'-dimethyl-indolo(3',2'-2,3)-19-nor-androstan-17β-ol. | ----do---- | 17-cyclopentylpropionate of 6',7'-dimethyl-indolo (3',2'-2,3)-19-nor-androstan-17β-ol. |

*Example VII*

A mixture of 1 g. of pyrrolo(3',2'-2,3)-17α-methyl-androstan-17β-ol, 10 cc. of acetic anhydride, 1 g. of p-toluenesulfonic acid hydrate and 50 cc. of acetic acid after 1 hour reaction at room temperature was poured into water and stirred until the excess anhydride had hydrolyzed. Isolation of the product by methylene chloride extraction afforded 1'-N-acetyl-pyrrolo(3',2'-2,3)-17α-methyl-androstan-17β-ol-17-acetate. This compound was treated with 25 cc. of a 2% potassium hydroxide methanolic solution. The reaction mixture was kept overnight at 0° C., then poured into water. The formed precipitate was filtered off, washed with water, dried under vacuum and recrystallized from acetone-hexane giving pyrrolo(3',2'-2,3)-17α-methyl-androstan-17β-ol-17-acetate.

The starting compounds listed below were treated with the acylating agent indicated following exactly the above technique, thus furnishing the products set forth below.

| Starting compound | Acylating agent | Product |
|---|---|---|
| 4'-ethyl-5'-methyl-pyrrolo (3',2'-2,3)-17α-methyl-androstan | acetic anhydride. | 17-acetate of 4'-ethyl-5'-methyl-pyrrolo-(3',2'-2,3)-17α-methyl-androstan-17β-ol. |
| 4'-ethyl-5'-methyl-pyrrolo (3',2'-2,3)-17α-vinyl-19-nor-androstan-17β-ol | propionic anhydride. | 17-propionate of 4'-ethyl-5'-methyl-pyrrolo(3',2'-2,3)-17α-vinyl-19-nor-androstan-17β-ol. |
| pyrrolo(3',2'-2,3)-17α-methyl-19-nor-androstan-17β-ol. | ----do---- | 17-propionate of pyrrolo (3',2'-2,3)-17α-methyl-19-nor-androstan-17β-ol. |
| 5',7'-dinitro-indolo(3',2'-2,3)-17α-methyl-androstan-17β-ol. | caproic anhydride. | 17-caproate of 5',7'-dinitro-indolo(3',2'-2,3)-17α-methyl-androstan-17β-ol. |
| 5'-bromo-indolo(3',2'-2,3)-17α-methyl-19-nor-androstan-17β-ol. | ----do---- | 17-caproate of 5'-bromo-indolo(3',2'-2,3)-17α-methyl-19-nor-androstan-17β-ol. |
| 5'-methyl-indolo(3',2'-2,3)-17α-vinyl-19-nor-androstan-17β-ol. | cyclopentyl-propionic anhydride. | 17-cyclopentylpropionate of 5'-methyl-indolo(3',2'-2,3)-17α-vinyl-19-nor-androstan-17β-ol. |
| 5'-methyl-indolo-(3',2'-2,3)-17α-ethynyl-19-nor-androstan-17β-ol. | ----do---- | 17-cyclopentylpropionate of 5'-methyl-indolo-(3',2'-2,3)-17α-ethynyl-19-nor-androstan-17β-ol. |

*Example VIII*

By substituting in the method of Example IV the amino-acetaldehyde by 2-aminopropionaldehyde, there were obtained the corresponding 5'-methyl-pyrrolo derivatives.

In a similar manner there was substituted the amino-acetaldehyde by 2-aminobutyraldehyde and 2-amino-3-methyl-butyraldehyde and there was afforded the corresponding 5'-ethyl-pyrrolo and 5'-isopropyl-pyrrolo derivatives respectively.

We claim:
1. A compound of the following formula:

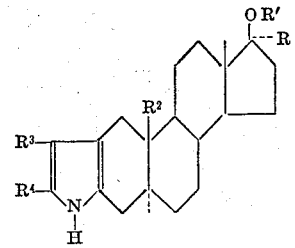

wherein R is selected from the group consisting of hydrogen, an alkyl, alkenyl and alkynyl group containing less than eight carbon atoms; $R^1$ is selected from the group consisting of hydrogen and a hydrocarbon carboxylic acyl group containing less than 12 carbon atoms; $R^2$ is selected from the group consisting of hydrogen and methyl; and $R^3$ and $R^4$ are each selected from the group consisting of hydrogen and a lower alkyl radical.

2. 4'-ethyl-5'-methyl-pyrrolo(3',2'-2,3)-androstan-17β-ol.

3. 4'-ethyl-5'-methyl-pyrrolo(3',2'-2,3)-17α-lower alkyl-androstan-17β-ol.

4. 4'-ethyl-5'-methyl-pyrrolo(3',2'-2,3)-19-nor-androstan-17β-ol.

5. 4'-ethyl-5'-methyl-pyrrolo(3',2'-2,3)-17α-lower alkyl-19-nor-androstan-17β-ol.

6. Pyrrolo(3',2'-2,3)-androstan-17β-ol.

7. Pyrrolo(3',2'-2,3)-19-nor-androstan-17β-ol.

8. The 17-acetate of 4'-ethyl-5'-methyl-pyrrolo(3',2'-2,3)-androstan-17β-ol.

9. The 17-propionate of pyrrolo(3',2'-2,3)-androstan-17β-ol.

10. A compound of the following formula:

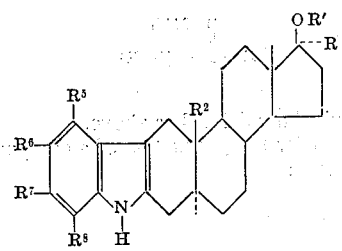

wherein R is selected from the group consisting of hydrogen, an alkyl, alkenyl and alkynyl group containing less than eight carbon atoms; $R^1$ is selected from the group consisting of hydrogen and a hydrocarbon carboxylic acyl group containing less than 12 carbon atoms; $R^2$ is selected from the group consisting of hydrogen and methyl; $R^5$, $R^6$, $R^7$, and $R^8$ are each selected from the group consisting of hydrogen, lower alkyl, nitro and halogen and $R^6$ and $R^7$ together represent a benzene ring.

11. Indolo(3',2'-2,3)-androstan-17β-ol.

12. 5',7'-dinitro-indolo(3',2'-2,3)-17-methyl-androstan-17β-ol.

13. 5'-bromo-indolo(3',2'-2,3)-17α-methyl-19-nor-androstan-17β-ol.

14. 5'-methyl-indolo(3',2'-2,3)-17α-ethynyl-19-nor-androstan-17β-ol.

15. 6',7'-dimethyl-indolo(3',2'-2,3)-androstan-17β-ol.

16. The 17-caproate of indolo(3',2'-2,3)-androstan-17β-ol.

17. The 17-cyclopentylpropionate of 6',7'-dimethyl-indolo(3',2'-2,3)-androstan-17β-ol.

18. A process for the production of compounds of the following formula:

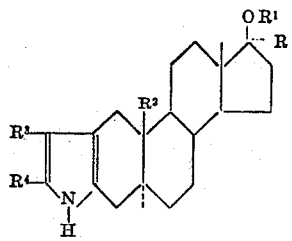

wherein R is selected from the group consisting of hydrogen, an alkyl, alkenyl and alkynyl group containing less than eight carbon atoms; $R^1$ is selected from the group consisting of hydrogen and a hydrocarbon carboxylic acyl group containing less than 12 carbon atoms; $R^2$ is selected from the group consisting of hydrogen and methyl; and $R^3$ and $R^4$ are each selected from the group consisting of hydrogen and a lower alkyl radical, which comprises condensing in the presence of an alkali metal alkoxide a compound of the following formula:

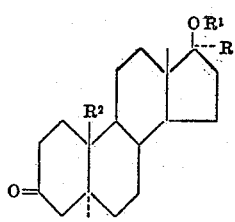

wherein R, $R^1$ and $R^2$ are defined as above with a compound of the following formula:

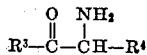

wherein $R^3$ and $R^4$ are defined as above.

19. A process for the production of a compound of the following formula:

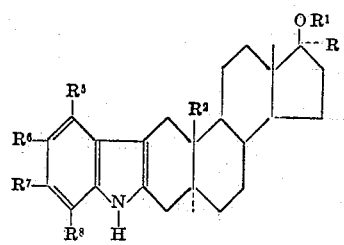

wherein R is selected from the group consisting of hydrogen, an alkyl, alkenyl and alkynyl group containing less than eight carbon atoms; $R^1$ is selected from the group consisting of hydrogen and a hydrocarbon carboxylic acyl group containing less than 12 carbon atoms; $R^2$ is selected from the group consisting of hydrogen and methyl; $R^5$, $R^6$, $R^7$ and $R^8$ are each selected from the group consisting of hydrogen, lower alkyl, nitro and halogen and $R^6$ and $R^7$ together represent a benzene ring, which comprises condensing in the presence of an alkali metal alkoxide a compound of the following formula:

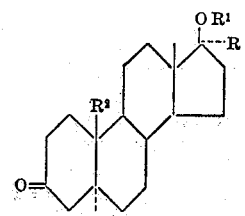

wherein R, $R^1$ and $R^2$ are defined as above with a compound of the following formula:

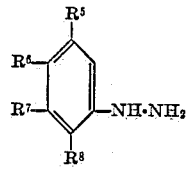

wherein $R^5$, $R^6$, $R^7$ and $R^8$ are defined as above.

References Cited in the file of this patent

UNITED STATES PATENTS 2,945,852    Bergstrom _____ July 19, 1960

OTHER REFERENCES

Clinton et al.: 81 J.A.C.S., 1513–14 (1959).

UNITED STATES PATENT OFFICE
CERTIFICATE OF CORRECTION

Patent No. 3,032,551 May 1, 1962

James C. Orr et al.

It is hereby certified that error appears in the above numbered patent requiring correction and that the said Letters Patent should read as corrected below.

Column 8, line 21, for "an alkali metal alkoxide" read -- acetic acid --.

Signed and sealed this 1st day of September 1964.

(SEAL)
Attest:

ERNEST W. SWIDER
Attesting Officer

EDWARD J. BRENNER
Commissioner of Patents

Disclaimer 3,032,551.—*James C. Orr* and *Albert Bowers*, Mexico City, Mexico. PYRROLO(3',2'-2,3)-ANDROSTANES AND PROCESS THEREFOR. Patent dated May 1, 1962. Disclaimer filed Feb. 4, 1966, by the inventors; the assignee, *Syntex Corporation*, assenting.

Hereby enter this disclaimed to claims 1 and 6 of said patent.
[*Official Gazette June 7, 1966.*]